No. 865,203. PATENTED SEPT. 3, 1907.
H. MUSTONEN & T. A. NISSINEN.
AUTOMATIC COFFEE ROASTER.
APPLICATION FILED JAN. 12, 1907.
4 SHEETS—SHEET 1.
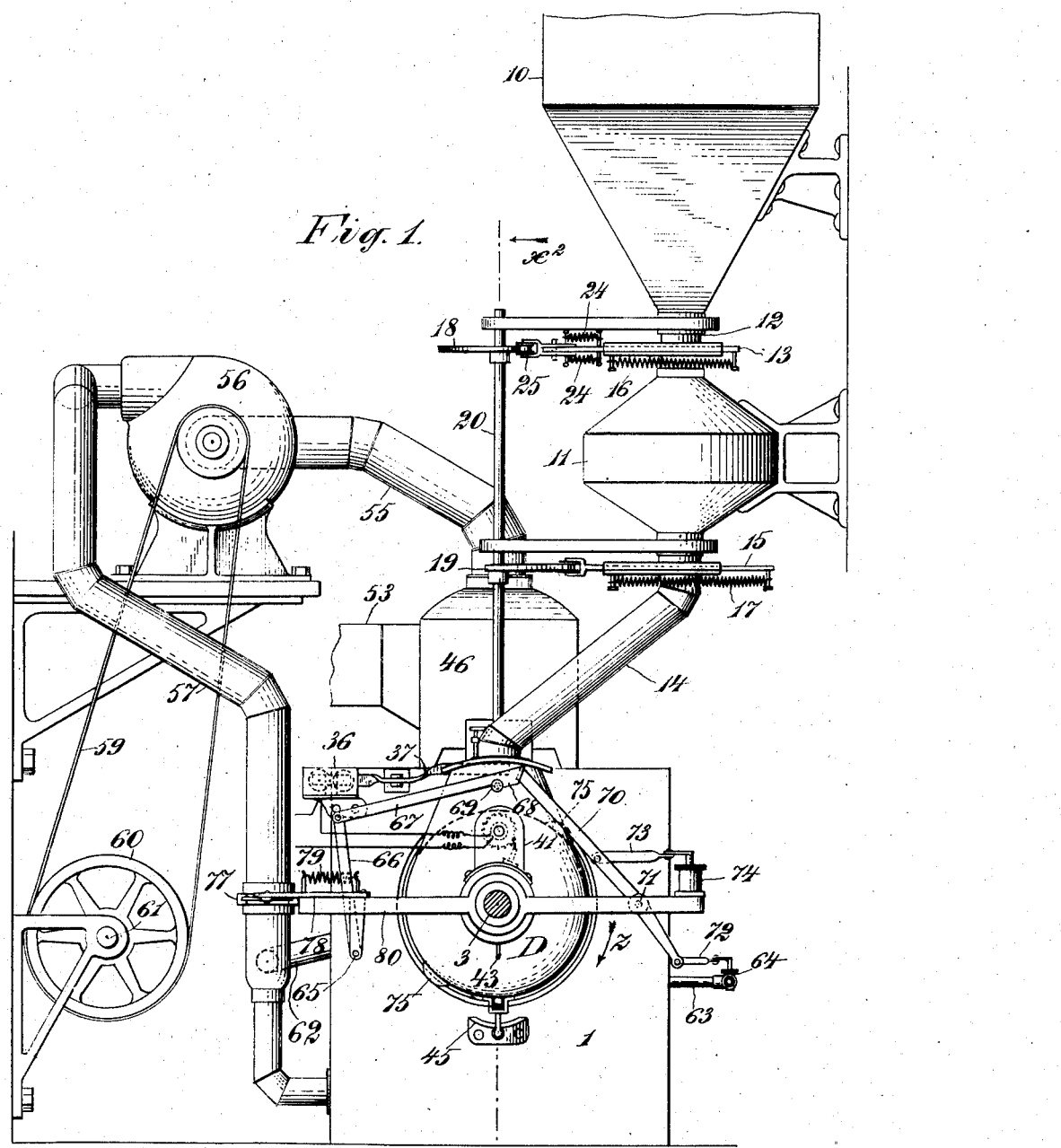

No. 865,203. PATENTED SEPT. 3, 1907.
H. MUSTONEN & T. A. NISSINEN.
AUTOMATIC COFFEE ROASTER.
APPLICATION FILED JAN. 12, 1907.

4 SHEETS—SHEET 2.

Henry Mustonen
Toimi A Nissinen
Inventor

Witnesses

By their Attorney

No. 865,203. PATENTED SEPT. 3, 1907.
H. MUSTONEN & T. A. NISSINEN.
AUTOMATIC COFFEE ROASTER.
APPLICATION FILED JAN. 12, 1907.
4 SHEETS—SHEET 3.
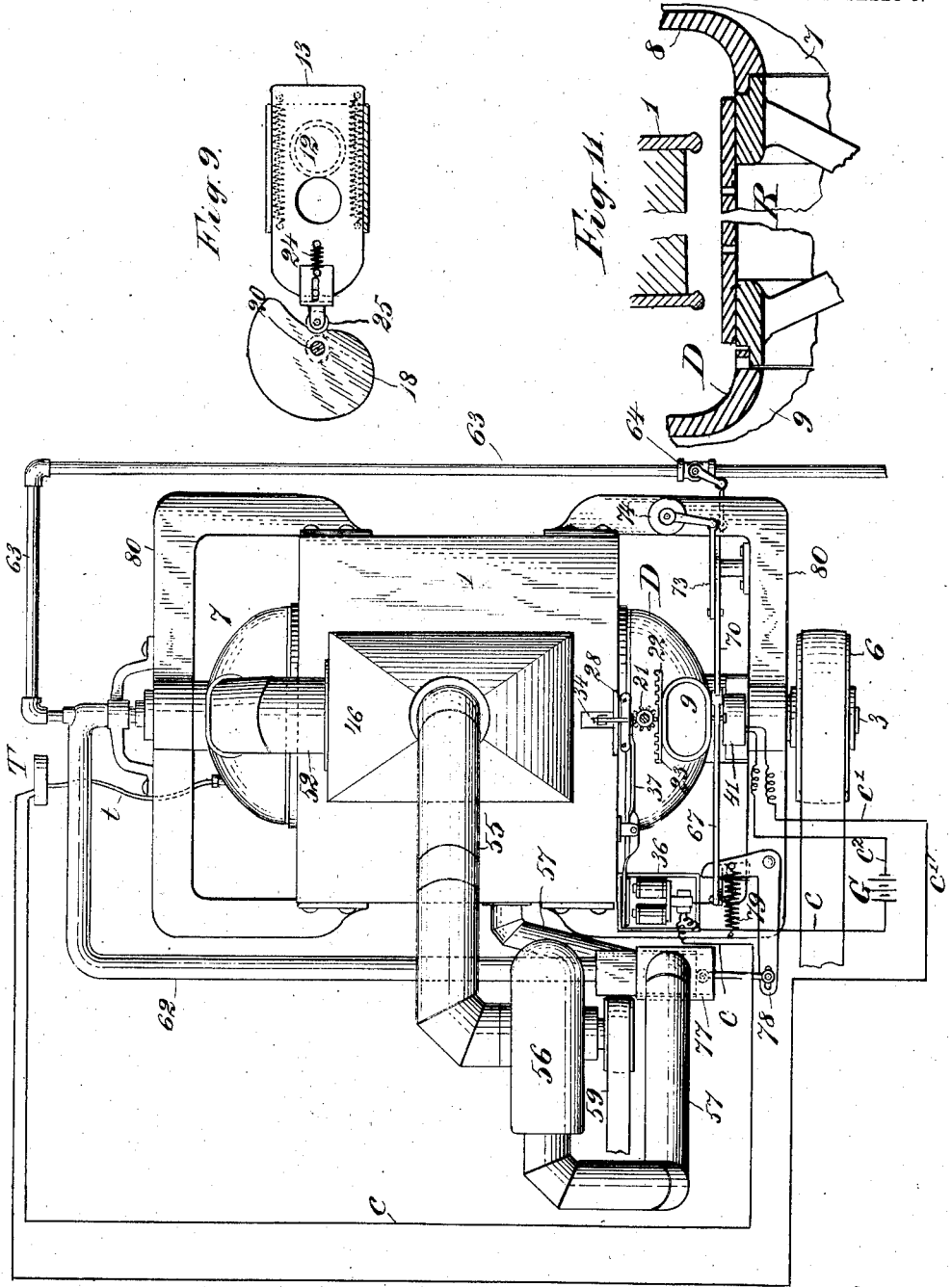
Witnesses
Henry Mustonen
Toimi A. Nissinen
Inventor
By Their Attorney

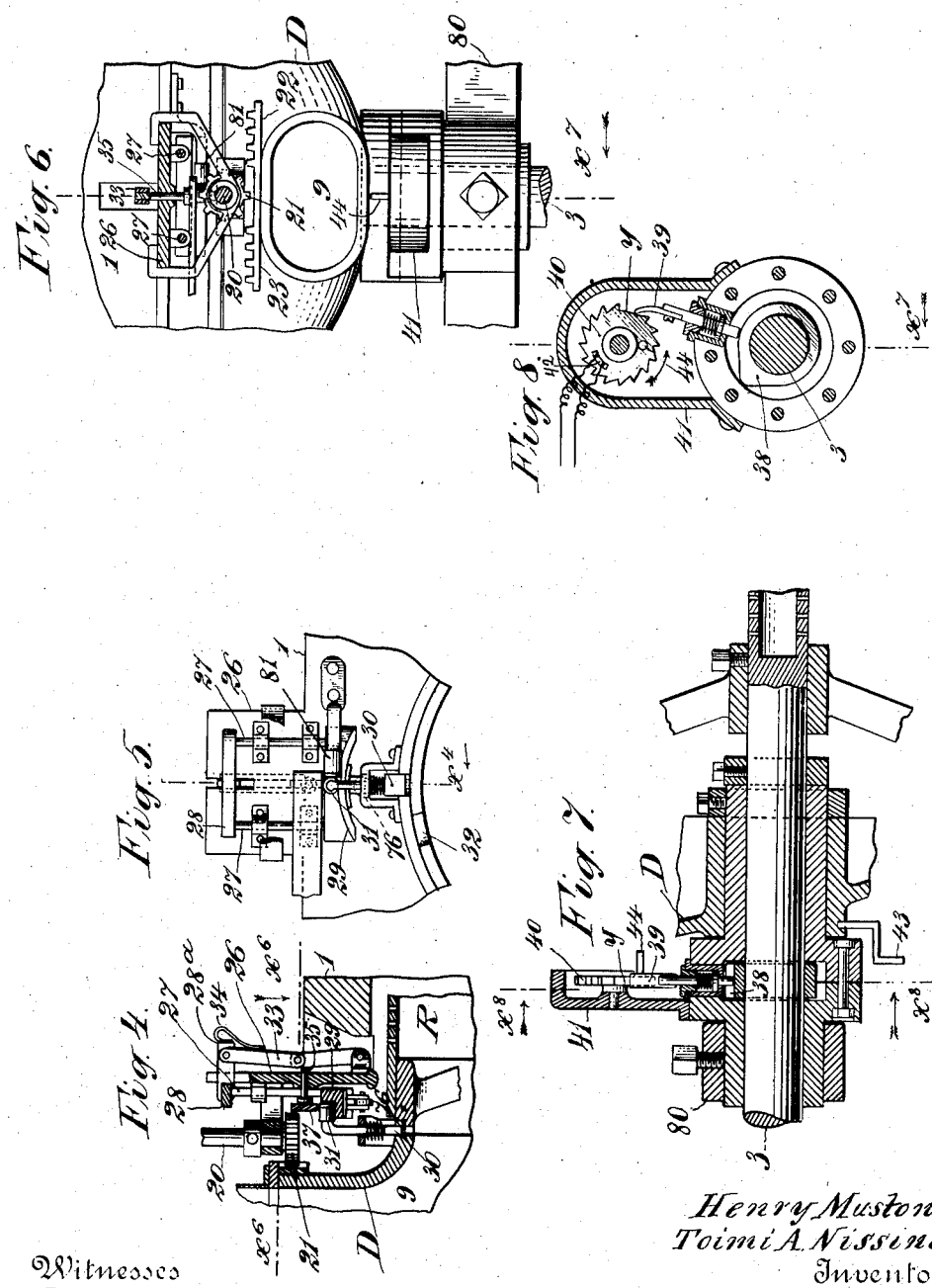

UNITED STATES PATENT OFFICE.

HENRY MUSTONEN AND TOIMI A. NISSINEN, OF UNION HILL, NEW JERSEY.

AUTOMATIC COFFEE-ROASTER.

No. 865,203.　　　　　Specification of Letters Patent.　　　　Patented Sept. 3, 1907.

Application filed January 12, 1907. Serial No. 352,001.

*To all whom it may concern:*

Be it known that we, HENRY MUSTONEN and TOIMI A. NISSINEN, both citizens of Finland, and subjects of the Czar of Russia, residing in Union Hill, county of Hudson, and State of New Jersey, have invented certain new and useful Improvements in Automatic Coffee-Roasters, of which the following is a specification.

This invention relates to machines or apparatus commonly employed for roasting coffee and the like, and the object is, in part, to provide the machine with certain automatic dumping and supplying features, and air-heating devices, all of which will be hereinafter described with reference to the accompanying drawings which illustrate an embodiment of the invention.

Figure 2:
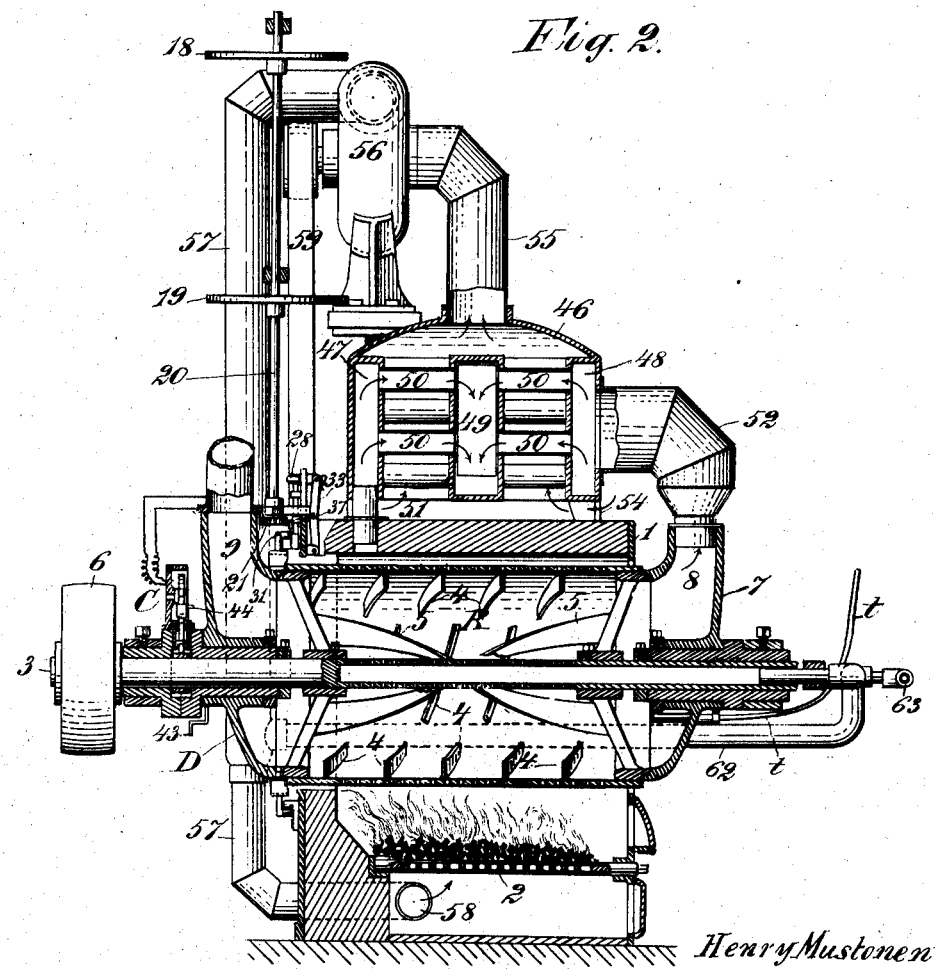

In the said drawings—Figure 1 is substantially a front elevation. Fig. 2 is a vertical section at line $x^2$ in Fig. 1. Fig. 3 is a plan, the elevated supply mechanism being omitted. These are general views, on a relatively small scale. Fig. 4 is a vertical, sectional view taken at line $x^4$ in Fig. 5; and Fig. 5 is an elevation as seen from the left in Fig. 4. Fig. 6 is a sectional plan view of the parts seen in Figs. 4 and 5, the plane of the section being indicated substantially by line $x^6$ in Fig. 4. Fig. 7 is a vertical section taken substantially at line $x^7$ in Fig. 8; and Fig. 8 is a vertical section taken at line $x^8$ in Fig. 7.

Figure 10:
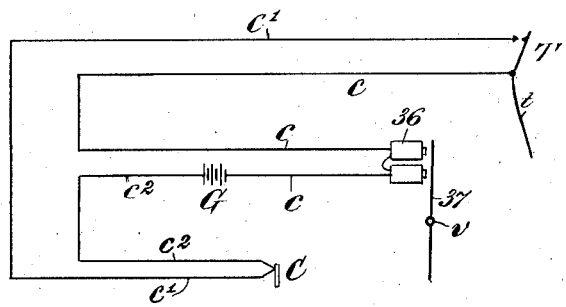

Figs. 4, 5 and 6, show the locking device for the dumping head of the roaster, and Figs. 7 and 8 show an automatic device for making and breaking an electric circuit which controls the locking means. Fig. 9 is a sectional detail view of the cut-off valve of the supply mechanism. Fig. 10 is a diagrammatic view showing the electric circuits. Fig. 11 includes enlarged sectional details of the connection between the cylinder of rotating roaster, and the adjacent parts.

Before proceeding to describe the structure of the machine in detail, it will be well to explain that there is a furnace, over the fire-bed of which rotates a perforated roaster provided interiorly with oblique blades which shift the coffee (or other material) from one end of the roaster to the other. The coffee is fed to the roaster in charges, automatically, by a supplying means to be hereinafter described. When the coffee is roasted and the gradually increasing temperature shall have reached a predetermined degree, there is an electric circuit completed through an electromagnet, the heat acting through a known device called a "thermometer-thermostat" to close said circuit. The magnet acts to set free a locking bolt, which then locks the rotating roaster to a normally stationary discharging and dumping head, and this head is thus compelled to turn with the roaster; but when the head is inverted or dumped by making a half-rotation, the bolt is withdrawn automatically and the head remains stationary while the roaster continues to rotate. The blades in the roaster now discharge the roasted coffee through the dumped head. But during the dumping of the discharging head, the latter in its movement, effects other objects, namely; it admits a jet of water into the hollow perforated axis of the roaster and cuts off the admission of hot air; and it sets in motion a circuit-closer and breaker which, after a predetermined number of rotations of the roaster (that is, sufficient to empty it) again locks the discharging head to the rotating roaster and causes the latter to right the head and return it to its normal position, when it is automatically unlocked again. The head will now occupy the position it first occupied, having made one complete rotation. There is another important object effected by the dumping of the discharging head, namely: In its first dumping movement the head acts (through mechanism to be described) to cut off the supply of coffee from a hopper to a measure or charge-receiver; and to open the conduit between the elevated receiver and the rotating roaster so that the charge will flow into the latter. The operating electromagnet is in a circuit, having in it two breaks, one controlled by the thermometer-thermostat and the other by the mechanically operated closer and breaker referred to above.

There is a device for heating air, and a blower for effecting its circulation, and these will be hereinafter described.

The construction will now be explained with reference to the drawings.

1 designates the furnace, and 2 the fire-bed therein. On a hollow—or partly hollow—shaft 3, extending through the furnace, is mounted the roaster R, here shown as a perforated cylinder provided with oblique blades 4 on its interior surface to move the coffee longitudinally in one direction, and two spiral blades 5, nearer the shaft, for moving it in the opposite direction. The roaster rotates in the direction indicated by arrow $z$ in Fig. 1, and the hollow shaft 3, within the roaster, is perforated. On the shaft is a pulley 6 for driving it. During the process of roasting, the roaster R rotates continuously in one direction. The cylinder of the roaster is open at both of its ends and is secured at each end to a sort of spoked wheel fixed on the shaft and forming a part of the roaster; but the roaster is closed at its rear end (at the right in Fig. 2) by a fixed end-piece 7, with an outlet-connection 8 for gases, as will be hereinafter explained. At the front end of the roaster (at the left, in Fig. 2) is another similar end-piece D called a discharging head. This head is capable of rotating about the shaft 3 and while it is normally stationary so that the coffee may pass through it to the roaster R, it is automatically dumped, or inverted, so that the roasted coffee may flow out of the roaster through the conduit 9 at which the green or unroasted coffee enters. In Fig. 11 is shown, on a relatively large scale, the manner of fitting the continuously rotating roaster to the heads of end-pieces, and to the furnace casing at the respective ends of the roaster.

Fig. 1 shows the means for supplying the green coffee in charges to the roaster at proper times. 10 is a hopper, or any suitable reservoir to contain the coffee; and 11 is the charge-holder or measure, interposed between the hopper and the roaster R. This measure or measuring vessel will be of the proper size to hold a sufficient quantity of coffee for a charge in the roaster. The bottom of the hopper 10 connects with the top of the measure 11 by a tubular conduit 12, in which is a cut-off slide or valve 13; and from the bottom of the measure 11 a conduit 14 leads to the inlet 9 of the discharging head D. In this conduit 14 is a cut-off slide or valve 15. The slides 13 and 15 are adapted to be closed, respectively, by springs 16 and 17, and to be opened respectively (in alternate order) by cams 18 and 19, on an upright shaft 20 (Figs. 1 and 9). This shaft bears, at its lower end, a pinion 21 adapted to gear with two short racks 22 and 23, on the inner face of the head D, when the latter is dumped and righted. The operation is as follows: Normally the valve 15 may be open and the valve 13 closed. When the head D starts to turn in dumping the rack 23 engages the pinion 21, and rotates it, the shaft 20, and the cams 18 and 19, half-way around. The effect of this is to close the valve 15 in the rotation of cam 19, and to open the valve 13 at substantially the same time through cam 18. The cams might be so constructed and set that one has a little lead over the other, but the movement is so rapid that the valves may in practice, move simultaneously in opposite directions. When the head D is righted, the rack 22 comes into play to act on the pinion 21, and reverse the movement of the valves. The valve 15 is opened to discharge the contents of the measure 11 into the roaster and the valve 13 is closed. As the valve 13 must pass through a mass of coffee in the conduit 12 in closing, cushion-springs 24 are provided on this valve 13 between the valve itself and the roller or part 25 thereof that bears on the operating cam. As the movement of the valve is rapid, this cushion prevents it in a good degree from chafing or breaking the grains of coffee in its passage.

The automatic locking and unlocking devices of the head D will now be described; calling special attention to Figs. 4, 5 and 6. Mounted on a fixed, slotted bracket-plate 26, in suitable keepers or sliding bearings, are two upright rods 27, connected above by a bar 28 and below by a curved and flanged cam-support 29; and mounted in guides on the head D is a spring bolt 30, the stem of which carries a laterally projecting stud 31—preferably a rolling stud—adapted to take over and be supported by a laterally projecting flange or track on the support 29. When permitted to drop, this bolt may enter a socket 32 in a continuously rotating part of the roaster R. The bar 28 has an arm $28^a$ which extends back through an upright slot in the bracket-plate 26, and at the back of the bracket is a supporting toggle 33, coupled at its upper end to the arm $28^a$, and at its lower end to lugs on the base of the bracket. A light spring 34 tends to hold the toggle straight and the parts carried by it uplifted. Extending through the bracket-plate, and loosely slidable therein, is a pin 35 which bears on the knuckle of the toggle. If this pin be pushed in, the knuckle of the toggle will be broken, back and the parts supported by it will fall of their own weight, thus allowing the bolt 30 to descend, and permitting its spring to drive it into the socket 32 when the latter comes into position. To press the pin 35 inward and break the knuckle of the toggle, an electromagnet 36, the lever-armature 37, of which is fulcrumed at $v$, and the end opposite to the magnet, bears on the head or end of the pin 35.

The magnet is in an electric circuit shown diagrammatically in Fig. 10. G is a generator from one pole of which a conductor $c$ extends to the coils of the electromagnet 36, and thence to a thermometer-thermostat T, where there is a break in the circuit. From the thermostat another conductor $c^1$ of the circuit extends to a mechanical make-and-break device C, at another break in the circuit; and from this device C another conductor $c^2$ of the circuit extends to the other pole of the generator G. To complete the circuit it must, of course, be closed at both T and C.

The device C will now be described in detail, referring more especially to Figs. 1 and 8. On the main shaft 3 is secured a cam 38, which, as the shaft rotates, acts operatively on a slidable spring-retracted pawl 39. Thus at each rotation of the shaft the pawl has imparted to it a reciprocating movement. This pawl engages the teeth of a ratchet-wheel 40, mounted rotatively in a suitable bracket-casing 41. The ratchet-wheel may have any desired number of teeth, one of which is omitted, as seen at the point $y$ in Fig. 8. When the main shaft shall have made as many revolutions as there are teeth in the ratchet-wheel it will have imparted one rotation to said wheel; the pawl will then engage the space $y$ and play to and fro therein without imparting any further rotative movement to the wheel. The wheel 40 is a circuit-closer, and carries a metal contact-piece 42 (see Fig. 8) which, as the wheel rotates, closes the break in the circuit at the ends of the conductors $c^1$ and $c^2$, at the casing 41, in a way well known to electricians. Now when the head D turns in dumping, a pin 43 on the boss of the head D (see Fig. 7), impinges on a stud 44 on the face of the ratchet-wheel 40 and turns the latter to the extent of one tooth, in the direction indicated by the arrow in Fig. 8, thus permitting the pawl 39 to operatively engage the teeth of the wheel and rotate it step-by-step as the roaster rotates. It will be understood that the heat in the roaster will keep the circuit through the electromagnet 36 closed at the thermostat T until a charge of cold, green coffee enters the roaster; and by the time the roaster is emptied and ready for a fresh charge the wheel 40 will have rotated far enough to cause the piece 42 to close the break the circuit at C and complete the same, when the magnet will act to again lock the head D to the roaster R, for righting the head so that the roaster may receive the fresh charge. It should be explained here that there are two like spring-bolts 30 disposed diametrically opposite on the head D. Figs. 4 and 5 show one of them upheld and ready to be dropped by the action of the electromagnet so that it may enter into the socket 32 in the roaster R, when the said socket is brought to co-incide with it by the rotation of the roaster. When the locking has been effected and the head D has made a half-rotation, a cam 45 on the adjacent fixed part (Fig. 1) withdraws the bolt and frees the head. The other bolt, 30, in the meantime, will have been carried up to the upper side and made to engage the cam-support 29, abutting against a cushion detent 81. It should be understood that in order to enable the parts to operate properly the toggle 33 must be straightened so as to uphold the bolt 30. The spring 34 cannot always be relied on to effect this when the circuit through the magnet is broken. Hence a cam 75 is mounted on the head D, and this cam passes under a roller 76 (Fig. 4) on the support 29 and lifts the latter and its connected parts, thus assisting the spring 34 to straighten the toggle and put the parts in condition to receive and uphold the bolt 30.

The air-heating means will now be explained, with especial reference to Fig. 2. Mounted on the furnace is a casing 46, having in it two end-chambers 47 and 48, and a central chamber 49, connected to the others by tubes or pipes 50. The products of combustion from the furnace enter the chamber 47 at 51, and the gases from the roaster R flow to the chamber 48 by a pipe 52. These gases go to the stack or chimney by a pipe 53, seen in Fig. 1. The air enters the chamber in the casing 46 at 54, about its lower edge, passes up about the tubes 50 and chambers 47 and 48, and is drawn out through a pipe 55 to a blower 56, and thence down by a pipe 57 to a point below the fire-bed 2, which it enters at 58 to supply the fire. The blower may be driven by a belt 59 and pulley 60, on a countershaft 61. A branch 62 from the air-pipe 57, leads to the end of the hollow shaft 3. A water-pipe 63 leads also to the ends of the hollow shaft 3, and in this pipe is a normally closed cock 64. The purpose is to admit a slight jet of water to the roaster R through its perforated shaft, at the moment of dumping, and to effect this automatically. This is done by means now to be described. Fulcrumed at 65 (Fig. 1) is a lever 66, which has coupled to its upper free end an arm 67, provided with a shoulder at 68 which is engaged by a headed pin 69 in the head D. Another lever 70, fulcrumed at 71, is coupled at its lower end, at 72, to the operating arm of the cock 64. At its upper end the lever 70 loosely engages a recess or slot in the free end of the arm 67. Above its fulcrum, the lever 70 is coupled by a link 73, to the arm of a door-check 74, or like device. Now when the head D is dumped, the stud or pin 69, carries the arm 67 a little way with it, swinging both of the levers 66 and 70, the latter lever acting through the coupling 72 to open the cock 64 in the water-pipe and admit water to the roaster. The pin 69, however soon releases itself from the arm 67 and allows the check 74 to close the cock 64. The water entering the perforated shaft 3 is converted into vapor which emerges from the perforations into the roaster. In order that the air may be cut off from the furnace and the roaster during the period of dumping, the device seen at the left in Figs. 1 and 3, is employed. In the air-pipe 57 is mounted a cut-off valve 77, coupled to one arm of an elbow-lever 78, and the lever 66 is so disposed as to engage the other arm of said elbow lever and hold the valve 77 open normally, or while the pin 69 engages the shoulder on the arm 67; but when, by the dumping rotation of the head D, the said pin is disengaged, a spring 79 rocks the elbow-lever and causes the latter to rock and close the valve 77. When the head D is righted, the pin 69 wipes under the arm 67, engages the shoulder 68 thereon, swings the elbow-lever 78 back to its former position, and again opens the valve 77. The shaft 3 is supported, as herein shown on frames 80 on the furnace.

Having thus described our invention, we claim—

1. A device for the purpose specified, having a rotating roaster, a furnace for heating the same, means for supplying a charge to the roaster, mechanism for actuating the supplying means, electromagnetic means for setting said mechanism in motion, and automatic means for closing the circuit through the electromagnet forming a part of said means.

2. A device for the purpose specified, having a rotating roaster, a furnace for heating the same, means for discharging the contents of the roaster when the temperature thereof shall have risen to a predetermined point, said means comprising a head D adapted to be locked to the rotating roaster, electromagnetic means for permitting said locking, and a thermostat for closing the circuit through said means when the temperature shall have risen above a predetermined point in the roaster.

3. A device for the purpose specified, having a continuously rotating roaster, a head D, capable of rotating with the roaster, for discharging the contents of the latter, automatic means for locking the head D to the roaster during one-half of a rotation of the head, thus inverting the same, automatic means for unlocking said head when it shall have been inverted, automatic means for again locking said head to the roaster for righting it when the roaster is emptied, automatic means for unlocking the head when righted, and automatic means for supplying the roaster with a fresh charge.

4. A device for the purpose specified, having a rotating roaster R, open at the end, means for heating the roaster, a normally stationary head D, for the roaster, said head having a conduit through which the coffee, or the like, is supplied to and discharged from the roaster, means for momentarily locking said head D to the roaster, an electromagnet and its armature adapted to put the locking mechanism in operative condition, an electric circuit having in it a break and including a generator and said electromagnet, a thermometer-thermostat adapted to close the break in said circuit and complete it through said electromagnet when the temperature in the roaster rises to a predetermined point, a cam which automatically unlocks the head D from the roaster when said head shall have been inverted, means for closing another break in said circuit, comprising a cam on the shaft of the roaster, a pawl actuated operatively by said cam, a ratchet-wheel actuated by said pawl, and a circuit-closer carried by said wheel for closing the said break, said ratchet wheel having a space $y$ denuded of a tooth or teeth, and means for turning said wheel to the extent of a tooth to effect engagement with the pawl, when the head D is dumped or inverted.

5. A device for the purpose specified, having a rotary roaster, means for heating the same, a normally stationary head D, for the roaster, adapted to rotate with the roaster for dumping when locked to the latter, means for effecting said locking when the charge in the roaster is roasted, a reservoir, 10, for the material, as coffee, to be roasted, a measuring vessel 11, for a charge of coffee, a conduit 12 connecting the said reservoir with the vessel, a valve 13 in said conduit, a conduit 14 connecting the measuring vessel with the head D, a valve 15 in said conduit, an upright shaft 20, cams 18 and 19 on said shaft and adapted to operate the respective valves 13 and 15 to close them alternately, a pinion on said shaft 20, and two racks 22 and 23 on the head D, one adapted to rotate the pinion when the head is inverted and the other to rotate it when the head is righted.

6. A device for the purpose specified, having a rotating roaster, a fixed head or end-piece 7 for same, provided with an outlet 8 for gases, a furnace in which the roaster rotates, said furnace having an outlet for gases, a casing 46 mounted on the furnace and provided with an inlet for air at the bottom, and interiorly with chambers connected with the interior of the furnace and with the interior of the roaster, for heating the air passing through the casing 46, a blower, a pipe connecting the induction side of the blower with said casing, a branched pipe connecting the eduction side of the blower, respectively with the furnace and the roaster, a valve in said pipe, means for opening and closing said valve, a head D for the roaster, means for locking said head to the roaster for inverting the head and righting it, and means carried by the said head for operating the said air-valve-closing means.

7. In a device for the purpose specified, a furnace, a roaster rotating in said furnace, a head D for said roaster, automatic means for locking said head to the roaster for inverting and righting said head, automatic means for supplying a charge to the roaster, means for heating and forcing air to the roaster, means for supplying water to the roaster, and mechanism actuated by the said head D when it is inverted for cutting off the supply of air and admitting water to the roaster.

8. A device for the purpose specified, having a furnace 1, a shaft 3 rotative therein, a roaster on said shaft, a rotatable head D for the roaster, said head having a conduit 9 for receiving the unroasted material and for discharging the same, automatic means for locking the head D to the roaster when the roasted charge is to be emptied, so as to rotate the head to an inverted position, automatic means for righting the head D, an air-heating and forcing device, a pipe, with branches leading the air from the blower to the roaster and the furnace, respectively, an air-valve 77 in said air-pipe, a water pipe to supply water to the roaster, a cock 64 in said water-pipe, and means for actuating said air-valve 77 and cock 64 when the head D is rotated, said means comprising an elbow-lever 78, one arm of which is coupled to the air-valve 77, a spring 79, coupled to the other arm of the elbow-lever and tending to close the air-valve, a lever 66, which normally engages the lever 78 and holds the air-valve open, a pin 69 in the head D, the slotted arm 67, coupled at one end to the lever 66 and provided with a shoulder 68 which normally engages the pin 69, a lever 70 coupled by one arm to the water-controlling cock 64 to open it, the other or upper arm of said lever engaging loosely the slot in the end of the arm 67, and means for closing the cock 64.

9. A device for the purpose specified, having a furnace, a rotating roaster R therein open at its end and provided with a bolt-socket 32, a rotatable head D for said roaster, said head having a conduit 9 through which the material to be roasted passes to and from the roaster, a spring bolt 30 on said head and adapted, when freed, to engage the socket in the head and lock the head to the roaster, a slidable supporting device for upholding said bolt, a toggle 33 which upholds said slidable device, a pin 35 for breaking the knuckle of the toggle so that the slidable device may operate and free the bolt, an electromagnet, the lever-like armature of said magnet, one arm of which bears on said pin, through which it breaks the knuckle of the toggle when the electromagnet is excited, a normally open electric circuit including a generator and said electromagnet, and automatic means for completing said circuit at proper times.

In witness whereof we have hereunto signed our names this 11th day of January 1907, in the presence of two subscribing witnesses.

HENRY MUSTONEN.
TOIMI A. NISSINEN.

Witnesses:
HENRY CONNETT,
WILLIAM J. FIRTH.